(12) United States Patent
Zhang et al.

(10) Patent No.: US 12,447,499 B2
(45) Date of Patent: Oct. 21, 2025

(54) PRODUCT WITH PROTECTIVE COATING

(71) Applicant: Lanto Electronic Limited, Kunshan (CN)

(72) Inventors: Hong Zhang, Kunshan (CN); Bin Li, Kunshan (CN); Soo-Keong Loo, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 18/395,231

(22) Filed: Dec. 22, 2023

(65) Prior Publication Data

US 2024/0123466 A1    Apr. 18, 2024

Related U.S. Application Data

(60) Division of application No. 17/526,115, filed on Nov. 15, 2021, now Pat. No. 11,904,351, which is a
(Continued)

(30) Foreign Application Priority Data

Jul. 2, 2019    (CN) .......................... 201910589171.5

(51) Int. Cl.
  *C09D 183/08*    (2006.01)
  *B05D 1/02*     (2006.01)
  (Continued)

(52) U.S. Cl.
  CPC ................. *B05D 1/38* (2013.01); *B05D 1/02* (2013.01); *B05D 1/28* (2013.01); *B05D 3/002* (2013.01);
  (Continued)

(58) Field of Classification Search
  None
  See application file for complete search history.

(56) References Cited

U.S. PATENT DOCUMENTS 5,009,931 A    4/1991    Yamane et al.
6,054,601 A    4/2000    Standke et al.
(Continued)

FOREIGN PATENT DOCUMENTS

CN    1703473 A    11/2005
CN    1771351 A    5/2006
(Continued)

OTHER PUBLICATIONS

International Search Report, issued in PCT/CN2019/113443, dated Mar. 27, 2020.

*Primary Examiner* — Michael P. Rodriguez
(74) *Attorney, Agent, or Firm* — Birch, Stewart, Kolasch & Birch, LLP

(57)    ABSTRACT

The application provides a product with a protective coating. Prepare a first precursor dispersion comprising a first active organic precursor, and the first active organic precursor is a fluorine-free monomer. Prepare a second precursor dispersion comprising a second active organic precursor, and the second active organic precursor is a fluorine-containing monomer. Apply the first precursor dispersion to a product body, and dry the applied first precursor dispersion to form a first dried layer. Apply the second precursor dispersion to the first dried layer to cover the first dried layer, and dry the applied second precursor dispersion to form a second dried layer, so that the first active organic precursor and the second active organic precursor are polymerized to obtain a product with a protective coating.

20 Claims, 6 Drawing Sheets

Related U.S. Application Data continuation of application No. PCT/CN2019/113443, filed on Oct. 25, 2019.

(51) Int. Cl.

| | | |
|---|---|---|
| *B05D 1/28* | (2006.01) | |
| *B05D 1/38* | (2006.01) | |
| *B05D 3/00* | (2006.01) | |
| *B05D 3/02* | (2006.01) | |
| *C09J 7/35* | (2018.01) | |
| *C09J 7/40* | (2018.01) | |
| *C09J 163/00* | (2006.01) | |
| *C09J 175/04* | (2006.01) | |
| *C09J 183/08* | (2006.01) | |
| *C09J 201/04* | (2006.01) | |
| *C08K 5/00* | (2006.01) | |

(52) U.S. Cl.
CPC ........... *B05D 3/007* (2013.01); *B05D 3/0254* (2013.01); *C09D 183/08* (2013.01); *C09J 7/35* (2018.01); *C09J 7/40* (2018.01); *C09J 7/401* (2018.01); *C09J 163/00* (2013.01); *C09J 175/04* (2013.01); *C09J 183/08* (2013.01); *C09J 201/04* (2013.01); *B05D 2401/10* (2013.01); *B05D 2518/12* (2013.01); *C08K 5/0041* (2013.01); *C09J 2203/326* (2013.01); *C09J 2301/208* (2020.08); *C09J 2301/304* (2020.08); *C09J 2301/408* (2020.08); *C09J 2301/41* (2020.08); *C09J 2301/416* (2020.08); *C09J 2427/005* (2013.01)

(56) References Cited

U.S. PATENT DOCUMENTS

| | | | |
|---|---|---|---|
| 2004/0157003 A1 | 8/2004 | Baumgart et al. | |
| 2006/0153993 A1* | 7/2006 | Schmidt | B05D 5/083 427/508 |
| 2007/0054056 A1* | 3/2007 | Albert | C09D 5/08 427/407.1 |
| 2009/0087680 A1 | 4/2009 | Takada et al. | |
| 2014/0309329 A1 | 10/2014 | Sawada et al. | |
| 2017/0335508 A1 | 11/2017 | Curran et al. | |
| 2018/0346770 A1* | 12/2018 | Itano | B32B 15/10 |

FOREIGN PATENT DOCUMENTS

| | | |
|---|---|---|
| CN | 101534786 A | 9/2009 |
| CN | 101724836 A | 6/2010 |
| CN | 102294851 A | 12/2011 |
| CN | 102875765 A | 1/2013 |
| CN | 103526564 A | 1/2014 |
| CN | 104057670 A | 9/2014 |
| CN | 104403029 A | 3/2015 |
| CN | 104629619 A | 5/2015 |
| CN | 105873688 A | 8/2016 |
| CN | 107699099 A | 2/2018 |
| CN | 107805434 A | 3/2018 |
| CN | 113661218 B | 6/2022 |
| JP | 2006-525376 A | 11/2006 |
| JP | 2007-501708 A | 2/2007 |
| JP | 2007-515498 A | 6/2007 |
| JP | 2010-502784 A | 1/2010 |
| JP | 2015-527436 A | 9/2015 |

* cited by examiner

PRODUCT WITH PROTECTIVE COATING

CROSS REFERENCE TO RELATED DISCLOSURE

This application is a divisional application of U.S. patent application Ser. No. 17/526,115, filed on Nov. 15, 2021, which claims the priority benefit of Chinese Patent Application Serial Number 201910589171.5, filed on Jul. 2, 2019, and International Application No. PCT/CN2019/113443, filed on Oct. 25, 2019, the full disclosure of which is incorporated herein by reference.

BACKGROUND

Technical Field

The application relates to the technical field of a polymer protective coating which is formed on a product, particularly to a product with a protective coating.

Related Art

Consumers are increasingly demanding the reliability of electronic products, so there are more and more researches on protective coatings for electronic components of electronic products. For example, electronic components, such as printed circuit boards, of electronic products are usually provided with protective coatings so as to improve the waterproof performance and the resistance to salt spray corrosion.

Generally, a parylene protective coating could be formed on the electronic devices by vapor deposition using paraxylene as a raw material. However, the rate of the film formation is slow and the efficiency is low.

SUMMARY

The embodiments of the application disclose a product with a protective coating so as to solve the problems that a protective coating of electronic products can only use a single-layer material having pores, and also solve the problems of the slow film formation rate and the low efficiency.

In order to solve the above technical problems, the application is implemented as follows.

The application provides a product with a protective coating comprises a product body and a polymer protective coating formed on a surface of the product body. The polymer protective coating is formed by in-situ polymerization, and the polymer protective coating comprises an inner polymer layer in contact with the product body and an outer polymer layer covering an outer surface of the inner polymer layer. The outer polymer layer is a fluorine-containing polymer layer formed by in-situ polymerization, and the inner polymer layer is a fluorine-free polymer layer formed by in-situ polymerization.

In some embodiments of the application, the polymer protective coating comprises an inner polymer layer in contact with the product body and an outer polymer layer covering the outer surface of the inner polymer layer. The outer polymer layer is a fluorine-containing polymer layer and the inner polymer layer is a fluorine-free polymer layer. Therefore, the waterproof performance of the polymer protective coating or the product body and the ability of anti-ultraviolet aging and self-cleaning function are improved by fully utilizing hydrophobicity, being not sticky to the touch and resistance to ultraviolet radiation of the fluorine-containing polymer layer used as the outer polymer layer. In addition, the inner polymer layer and the outer polymer layer formed by in-situ polymerization form a polymer protective coating together, so that the inner polymer layer and the outer polymer layer can compensate each other in structure to form a dense protective coating. Furthermore, the waterproof performance and the resistance to salt spray corrosion of the polymer protective coating and the product body are improved.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The figures described herein are used to provide a further understanding of the application and constitute a part of the application. The exemplary embodiments and descriptions of the application are used to illustrate the application and do not limit the application, in which.

DETAILED DESCRIPTION OF THE EMBODIMENTS

Figure 1:
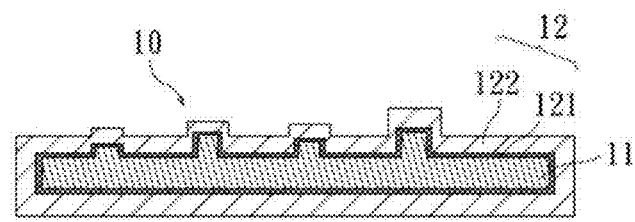
FIG. 1 is a schematic diagram of the structure of the product with a protective coating of the application.

In order to make the objectives, technical solutions, and advantages of the present application more clear, the technical solutions of the application will be described clearly and completely in conjunction with specific embodiments and the figures of the application. Obviously, the described embodiments are only a part of the embodiments of the application, rather than all the embodiments. Based on the embodiments in the application, all other embodiments obtained by a person of ordinary skill in the art without creative work fall within the protection scope of this disclosure.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/ substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Please refer to FIG. 1, which is a schematic diagram of the structure of the product with a protective coating of the application. The product 10 with a protective coating comprises a product body 11 and a polymer protective coating 12 formed on a surface of the product body 11 by in-situ polymerization. In other words, the polymer protective coating 12 covers the entire product body 11. The polymer protective coating 12 comprises an inner polymer layer 121 in contact with the product body 11 and an outer polymer layer 122 covering the outer surface of the inner polymer layer 121. The outer polymer layer 122 is a fluorine-containing polymer layer, and the inner polymer layer 121 is a fluorine-free polymer layer. It is noted that, the polymer protective coating 12 covering the entire product body 11 can be understood as the polymer protective coating 12 is formed on the outer surface and/or an inner surface of the product body 11, and the polymer protective coating 12 can be formed on the entire surface of the product body 11 or can be selectively formed on a part of the surface of the product body 11. Wherein, the fluorine-containing polymer layer is a perfluorocarbon organosiloxane polymer layer, and the fluorine-free polymer layer comprises one or more of an alkoxysilane polymer layer, an epoxy resin polymer layer, a polyurethane polymer layer, and an acrylate polymer layer. The alkoxysilane polymer layer is amphiphilic, an organic end thereof can be similar and compatible with the outer layer, and a silane end thereof can be well attached to the product body 11 (for example, the product body is made of metal), resulting in improving the slight roughness (i.e. to compensate the pores on the surface) of the product body 11 while having good hydrophobicity. Therefore, the polymer protective coating 12 can have excellent waterproof performance and resistance to salt spray corrosion by using the combination of materials disclosed herein. The fluorine-containing polymer layer has good waterproof performance, being not sticky to the touch, and resistance to ultraviolet radiation. In this way, the waterproof performance of the product 10 with a protective coating can be significantly improved by applying the fluorine-containing polymer layer as the outer polymer layer, and the ability of anti-ultraviolet aging and self-cleaning can be also improved. The quality of the product 10 with a protective coating is improved. In addition, the roughness of the surface of the product body 11 can be compensated by the inner polymer layer 121, such that the outer polymer layer 122 can form a dense film without micropores. The polymer protective coating 12 forms a dense film layer as a whole, such that the protective performance thereof is improved. In other words, the inner polymer layer 121 and the outer polymer layer 122 compensate each other in structure, such that the polymer protective coating 12 is denser, and the waterproof performance as well as the resistance to salt spray corrosion of the product 10 with a protective coating are improved. In other words, the polymer protective coating 12 of the application can have good adhesion with the product body 11, waterproof performance, and resistance to salt spray corrosion.

Figure 2:
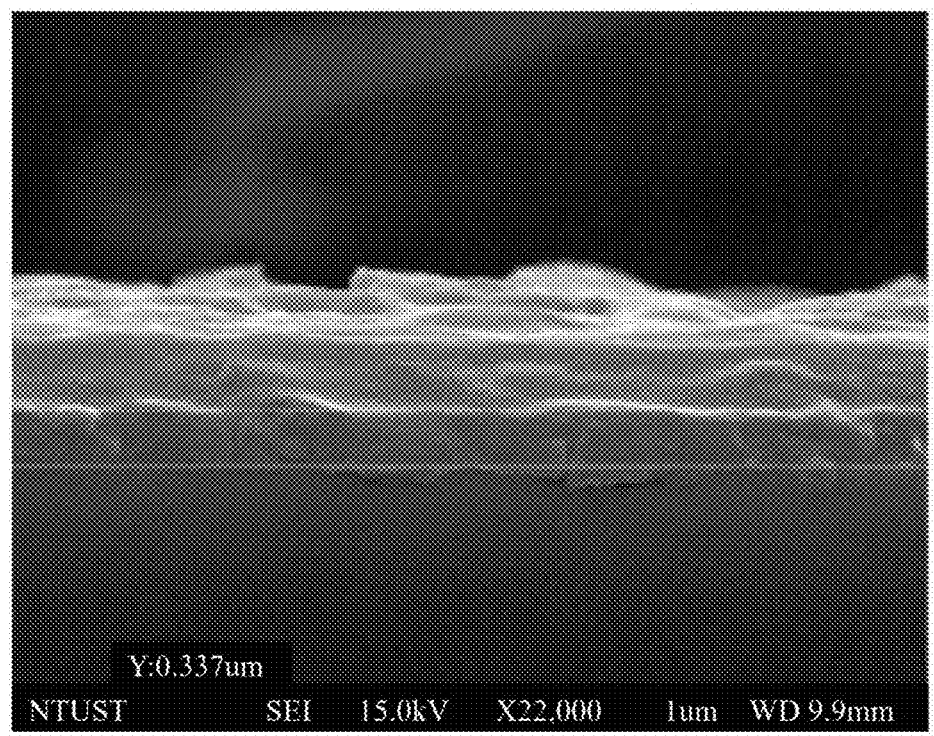
FIG. 2 is an SEM image of a cross-section of an example of the protective coating.

As shown in FIG. 2, which is an SEM image of a cross section of an example of the protective coating. The inner polymer layer 121 and the outer polymer layer 122 are chemically cross-linked. The inner polymer layer 121 and the outer polymer layer 122 have a good interlayer bonding force therebetween, and even form a single membrane structure without delamination. The polymer protective coating 12 is denser, such that the waterproof performance and the resistance to salt spray corrosion of the product with the protective coating 10 are further ensured.

The product body 11 can generally be a printed circuit board, such as a printed circuit board of a mobile phone (e.g., smart phones or pagers), a sound and audio device (e.g., radios or personal audio apparatuses), a headset (e.g., wireless earphones, Bluetooth earphones, or anti-noise earphones), a video device (TVs, DVD players, portable DVD players, video recorders, virtual reality devices, augmented reality devices, or extended reality devices), a communication device (e.g., digitals and other set-top boxes, computers and related components, game control panels, or antennas), a watch (e.g., electronic watches or smart watches), a data storage device, a lighting device, and a power bank. Certainly, other electronic components can also be used as the product body 11 herein.

It should be understood that, although FIG. 1 only shows the polymer protective coating 12 having a two-layer structure, that is, the inner polymer layer 121 and the outer polymer layer 122, the polymer protective coating 12 can also have a multiple-layer structure having more than two layers in fact. For example, the polymer protective coating 12 can have two, three or more inner polymer layers 121 (that is, a plurality of inner polymer sublayers) and one outer polymer layer 122; the polymer protective coating 12 can also have two layers, three layers or more inner polymer layers 121 (that is, a plurality of inner polymer sublayers) and two, three or more outer polymer layer 122 (that is, a plurality of outer polymer sublayers); the polymer protective coating 12 can also have one inner polymer layer 121 and two, three or more outer polymer layers 122 (that is, a plurality of outer polymer sublayers). The multi-layer inner polymer layer 121 can better compensate the roughness of the surface of the product body 11, which makes the polymer protective coating 12 denser. The roughness of the surface of the product body 11 can also be compensated by the multi-layer outer polymer layer 122, such that the waterproof performance, ability of anti-ultraviolet aging, and self-cleaning of the product 10 with the protective coating are further improved. As a result, the polymer protective coatings 12 with different structures can be used according to different products. Furthermore, users can combine the inner polymer sublayer 121 and/or the outer polymer sublayer 122 with different properties to achieve the best synergistic protection effect according to their requirements.

In an embodiment, the inner polymer layer 121 (i.e., the fluorine-free polymer layer) is an alkoxysilane polymer layer, and the outer polymer layer 122 (i.e., the fluorine-containing polymer layer) is a perfluorocarbon silicone-oxyane polymer layer. The alkoxysilane polymer has good film-forming properties, good adhesion to the product body 11, and hydrophobicity, resulting in being particularly suitable as the inner polymer layer 121. The perfluorocarbon organosiloxane polymer has excellent hydrophobicity, being not sticky to the touch, and resistance to ultraviolet radiation, resulting in being particularly suitable as the outer polymer layer 122. Thus, the polymer protective coating 12 would have excellent waterproof performance, and resistance to salt spray corrosion. In addition, the polymer protective coating 12 comprises a fluorescent agent. The fluorescent agent is an externally added fluorescent agent or an internally added fluorescent agent. Wherein, the externally added fluorescent agent comprises one or more of a stilbene type fluorescent agent, a coumarin type fluorescent agent, a pyrazoline type fluorescent agent, a benzoxazole type fluorescent agent, and a dimethyl imide type fluorescent agent. Wherein, the internally added fluorescent agent connects to the outer polymer layer and/or the inner polymer layer through one or more of an epoxy group, an unsaturated triple bond, an unsaturated double bond, a silicone, a —COONH—, a —OH, a —COOH, a —NH$_2$, and —SH. In detail, the inner polymer layer 121 or the outer polymer layer 122 comprises a fluorescent agent, or both the outer polymer layer 122 and the inner polymer layer 121 comprise a fluorescent agent. Wherein the fluorescent agent in the outer polymer layer 122 can be the same or different as the fluorescent agent in the inner polymer layer 121. In some embodiments of the application, the fluorescent agent in the outer polymer layer 122 is the same as the fluorescent agent in the inner polymer layer 121, so that the polymer protective coating 12 has an obvious indicating effect. Therefore, the conditions of the polymer protective coating 12 can be better examined at any time, and then the polymer protective coating 12 can be repaired in time. In some embodiments of the application, the fluorescent agent in the outer polymer layer 122 is different from the fluorescent agent in the inner polymer layer 121. For example, the fluorescent agent in the outer polymer layer 122 and the fluorescent agent in the inner polymer layer 121 can indicate different colors of fluorescence under ultraviolet light. Thus, the respective conditions of the outer polymer layer 122 and the inner polymer layer 121 can be clearly observed. Therefore, the maintenance can be conducted for the respective layers. Furthermore, in some of the embodiments, the inner polymer layer 121 and/or the outer polymer layer 122 comprise multiple layers, each of the inner polymer layers 121 and/or each of the outer polymer layers 122 comprise a fluorescent agent, or only a part of the inner polymer layer 121 and/or the outer polymer layer 122 comprise a fluorescent agent. In some embodiments of the application, each of the inner polymer layer 121 and/or each of the polymer layer 122 comprise a fluorescent agent, wherein the fluorescent agent in each of the sublayers of the inner polymer layer 121 and/or the fluorescent agent in each of the sublayers of the outer polymer layer 122 are the same or different. For example, when the fluorescent agent in each of the sublayers of the inner polymer layer 121 is the same as the fluorescent agent in each of the sublayers of the outer polymer layer 122, each of the sublayers of the inner polymer layer 121 and each of the sublayers of the outer polymer layer 122 can indicate the same fluorescence color. Therefore, the inner polymer layer 121 and the outer polymer layer 122 have an obvious indication effect, thereby the conditions of the inner polymer layer 121 and the outer polymer layer 122 can be better examined at any time. When the fluorescent agent in each of the sublayers of the inner polymer layer 121 is different from the fluorescent agent in each of the sublayers of the outer polymer layer 122, each of the sublayers in the inner polymer layer 121 and each of the sublayers in the outer polymer layer 122 can indicate different fluorescence colors. Therefore, the respective conditions of each of the sublayers can be clearly observed, such that the maintenance for the respective layers can be conducted.

In this embodiment and some of the embodiments, the inner polymer layer 121 comprises an adhesive resin. The adhesive resin is selected from the group consisting of a silicone resin, an epoxy resin, an acrylic resin, a polyurethane resin, and a polyester resin. The adhesive resin can attach to the product body 11 well. Therefore, the adhesion of the protective coating to the product body 11 is further improved, and the risk that the coating peeling off from the product body 11 is reduced. As shown in FIG. 1, the thickness of the outer polymer layer 122 is greater than or equal to the thickness of the inner polymer layer 121. For example, the thickness ratio of the outer polymer layer 122 to the inner polymer layer 121 can be 1:(0.1 to 1). In particular, the thickness ratio can be 1:0.1, 1:0.2, 1:0.3, 1:0.4, 1:0.5, 1:0.6, 1:0.7, 1:0.8, 1:0.9, 1:1 and the like. The thickness of the protective coating should not be too thick to affect the heat dissipation of the electronic components. A flexible protective coating is generally required for flexible PCBs (printed circuit boards) and positions to be folded. Therefore, an inner polymer layer 121 with a smaller internal thickness can be selected. For one thing, the total thickness of the protective coating can be reduced. For the other thing, the slight roughness of the product body 11 can be improved well. Therefore, the dense outer polymer layer 122 on the inner polymer layer 121 can be formed. Thereby, the dense polymer protective coating 12 can be formed through the good compensation between inner polymer layer 121 and the outer polymer layer 122. The thickness of the outer polymer layer 122 is 0.5 to 10 μm, and the thickness of the polymer inner layer 121 is 0.1 to 2 μm. In this embodiment and some of the embodiments, the thickness of the outer polymer layer 122 is 1 to 5 μm, and the thickness of the polymer inner layer 121 is 0.5 to 1 μm. The combination of the outer polymer layer 122 with 1 to 5 μm thickness and the inner polymer layer 121 with 0.5 to 1 μm thickness can form a dense polymer protective coating 12 without significantly increasing the thickness of the polymer protective coating 12. Therefore, the formed flexible coating has flexibility, and the formed flexible coating has good protection for certain parts which require higher light transmission. Furthermore, the heat dissipation performance of the product 10 with a protective coating is improved.

Figure 3:
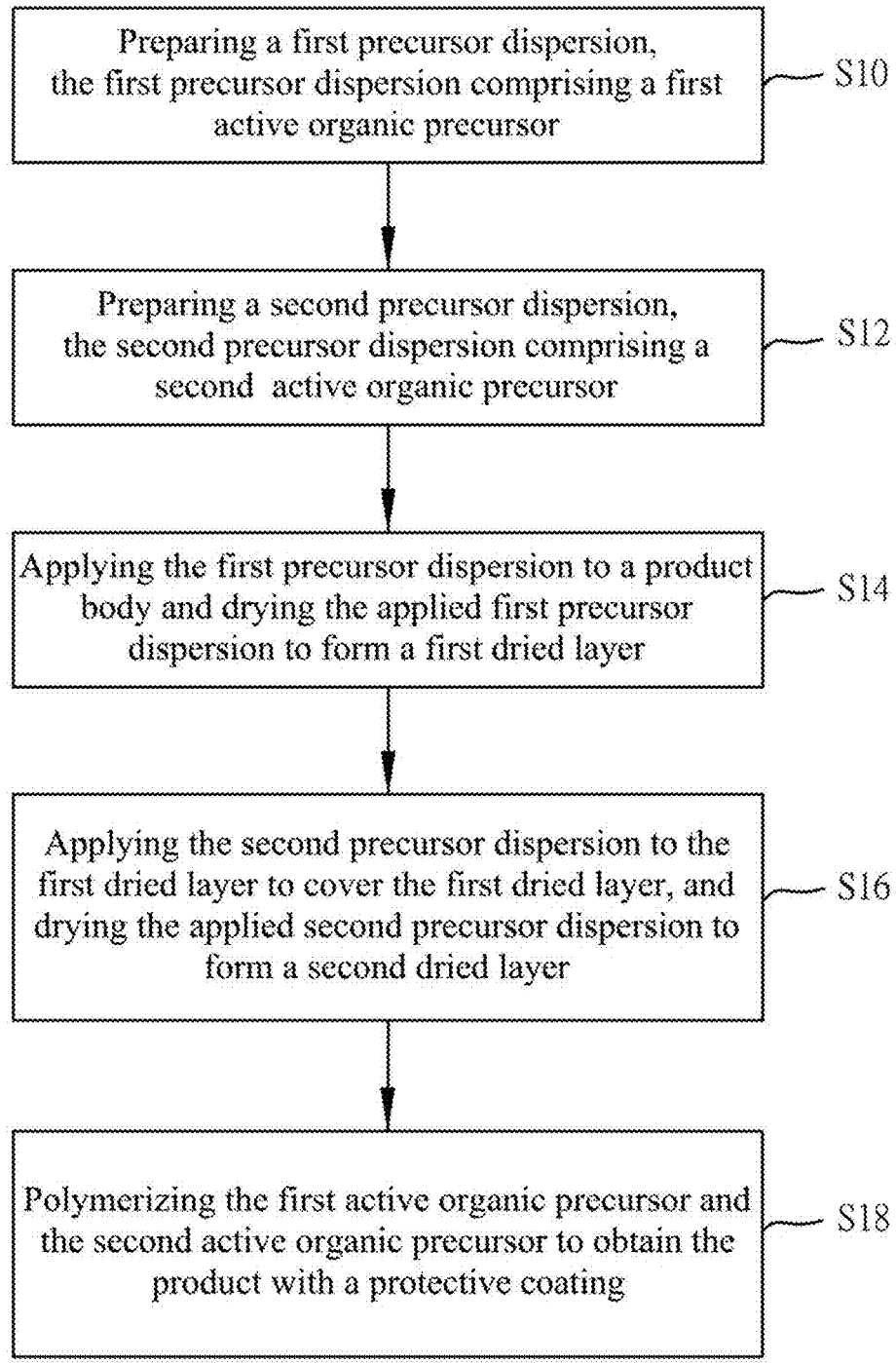
FIG. 3 is a flowchart of the first embodiment of the manufacturing method of the product with a protective coating of the application.

The followings further describe the manufacturing method of the product 10 with a protective coating. Please refer to FIG. 1 and FIG. 3, and FIG. 3 is a flowchart of the first embodiment of the manufacturing method of the product with a protective coating of the application. As shown in step S10, a first precursor dispersion is prepared. That is, an alkoxysilane, a silicone resin, a stilbene type fluorescent agent, an alkyl titanium catalyst, and an isocyanate curing agent are dispersed in a hydrofluoroether solvent to obtain the first precursor dispersion. In the first precursor dispersion, the content of the alkoxysilane is 24.3 wt %, the content of the adhesive resin is 1.4 wt %, the content of the fluorescent agent is 0.08 wt %, the content of the catalyst is 0.05 wt %, the content of the isocyanate curing agent is 4.2 wt %, and the rest is hydrofluoroether solvent and unavoidable impurities. As shown in step S12, a second precursor dispersion is prepared. That is, a perfluorocarbon organosiloxane, a stilbene type fluorescent agent, an alkyl titanium catalyst, and an isocyanate curing agent are dispersed in a hydrofluoroether solvent to obtain the second precursor dispersions. In the second precursor dispersion, the content of the perfluorocarbon organosiloxane is 22.8 wt %, the content of the catalyst is 0.8 wt %, the content of the fluorescent agent is 0.1 wt %, the content of the isocyanate curing agent is 3.2 wt %, and the rest is hydrofluoroether solvent and unavoidable impurities. The adhesive resin is silicone resin, but the application is not limited thereto. In other embodiments, the adhesive resin can be selected from the group consisting of a silicone resin, an epoxy resin, an acrylic resin, a polyurethane resin, and a polyester resin. That is, the adhesive resin can be one or more of a silicone resin, an epoxy resin, an acrylic resin, a polyurethane resin, and a polyester resin. In one embodiment, the catalyst is an alkyl titanium catalyst, but the application is not limited thereto. In other embodiments, the catalyst is selected from the group consisting of an alkyl titanium catalyst, an alkyl aluminum catalyst, and an alkyl tin catalyst. That is, the catalyst can be one or more of an alkyl titanium catalyst, an alkyl aluminum catalyst, and an alkyl tin catalyst. Before the step of applying the first precursor dispersion to the product body 11, the method further comprises a step of performing a pretreatment to a surface of the product body 11 to clean and/or activate the surface. In detail, the pretreatment comprises one or more of a plasma treatment, an electric discharge treatment, a sandblasting treatment, a polishing treatment, a flame treatment, and a primer treatment. Thereby, the first precursor dispersion can be better attached to the product body 11.

As shown in step S14, the first precursor dispersion is applied to the product body 11 (such as a printed circuit board) and then dried at room temperature for 1 to 10 minutes, wherein the room temperature refers to a temperature between 20° C. and 25° C. In this embodiment, the applied first precursor dispersion is dried at 20° C. for 1 minute so as to remove the hydrofluoroether solvent. Thereby, a first dried layer is formed. The solvent in the first precursor dispersion can be completely evaporated under the drying condition, and it can prevent the first active organic precursor from being polymerized earlier than expected. The first dried layer refers to the inner polymer layer 121. As shown in step S16, the second precursor dispersion is applied to the first dried layer to cover the first dried layer. The applied second precursor dispersion is dried at room temperature for 1 to 10 minutes. In this embodiment, the applied second precursor dispersion is dried at 20° C. for 1 minute. Then, the applied second precursor dispersion is dried at 70 to 90° C. for 1 to 10 minutes. In this embodiment, the applied second precursor dispersion is dried at 80° C. for 2 minutes so as to remove the hydrofluoroether solvent. Thereby, the second dried layer covering the first dried layer is formed. The pre-drying process at room temperature is performed for evaporating the solvent, such that the second dried layer, which is thicker, is preliminary formed. The drying process at 80° C. for 2 minutes is performed for evaporating the solvent quickly, and it can prevent the second active organic precursor from being polymerized earlier than expected. The second dried layer refers to the outer polymer layer 122. It should be noted that the applied amount of the second precursor dispersion is greater than the applied amount of the the first precursor dispersion so that the thickness of the second dried layer is greater than the thickness of the first dried layer. Finally, as shown in step S18, the first active organic precursor and the second active organic precursor are polymerized so as to obtain the product 10 with a protective coating. In detail, a specimen 111, i.e. the product 10 with a protective coating is obtained through polymerizing the second drying layer and the first drying layer on the product body 11 at 23° C. and 50% humidity for 24 hours. It is noted that, in the embodiment described above, the thicker second dried layer can be formed by a two-step drying process, such that it can prevent the second active organic precursor from being polymerized earlier than expected. As the polymerization conditions for the polymerization step are readily performed, the first active organic precursor and the second active organic precursor are significantly polymerized. Therefore, the inner polymer layer 121 and the outer polymer layer 122 can be polymerized respectively, and the chemical cross-linking occurs at the interface of the two layers. Therefore, the inner polymer layer 121 can be integrated with the outer polymer layer 122 to ensure that the protective coating is dense. As a result, the waterproof performance and the resistance to salt spray corrosion of the polymer protective coating 12 or the product body 11 are further ensured. The first drying layer is transformed into an inner polymer layer 121, and the second drying layer is transformed into an outer polymer layer 122. It is also noted that, in the above description, the inner polymer layer 121 and the outer polymer layer 122 are formed by in-situ polymerizing the first dried layer and the second dried layer on the product body 11. Wherein, the initiation condition for forming the polymer protective coating 12 can be a moisture curing, a heat curing, an UV curing, or an electron beam curing, but the application is not limited thereto.

As mentioned above, FIG. 2 is an SEM image of the specimen 111. FIG. 2 shows that the inner polymer layer 121 and the outer polymer layer 122 are tightly combined with each other, therefore the dense polymer protective coating 12 is formed. Specifically, there are no other layers between the inner polymer layer 121 and the outer polymer layer 122, and each of the layers has a single film structure which is uniformly polymerized. There are no pinholes or defects in the structure. The thickness of the inner polymer layer 121 and the thickness of the outer polymer layer 122 of the specimen 111 are tested. The static water contact angle (WCA) of the polymer protective coating 12 is tested (the environment parameters of the test: 25° C./50%). The adhesion test is performed according to GBT9286-1998 standard. The resistance to salt spray corrosion test is performed in a 5% (mass) NaCl solution (pH value: 6.5 to 7.2) at 35±1° C., according to GB6458-86-salt spray test national standard. The flexural resistance test is performed. The light transmittance test is performed according to GB-T2410-2008 standard.

For the resistance to salt spray corrosion test, the level of resistance to salt spray corrosion of the examples is defined as level 0 when the examples have 0% rust area. The level of resistance to salt spray corrosion of the examples sample is defined as level 1 when there is less than 1% of the area on the examples is rust area. The level of resistance to salt spray corrosion of the examples is defined as level 2 when there is less than 5% of the area on the examples is rust area. The level of resistance to salt spray corrosion of the examples is defined as level 3 when there is less than 10% of the area on the examples is rust area. The level of resistance to salt spray corrosion of the examples is defined as level 4 when there is less than 20% of the area on the examples is rust area. The level of resistance to salt spray corrosion of the examples is defined as level 5 when the examples have more than 20% of the area on the examples is rust area.

The flexural resistance test is performed according to the following method: applying the polymer protective coating on a polyimide (PI) film in sequence, bending the polyimide film with 180-degree after completely cured, and determining the result. Level 0: no creases or only slight creases. Level 1: multiple cracks appear, wherein the coating is not peeled off. Level 2: multiple cracks appear, wherein the coating is peeled off. Level 3: the coating is damaged and peeled off.

The above experiments and tests are repeated with different materials. The composition of the different embodiments is shown in Table 1, and the test results are shown in Table 2.

It should be noted that, when the specimen 333 is prepared, two kinds of first precursor dispersions (as shown in Table 1) are used to form the inner polymer layer 121, and one kind of second precursor dispersion (as shown in Table 1) is used to form an inner polymer layer 121. Therefore, the inner polymer layer 121 has two sublayers, and the outer polymer layer 122 is a single layer.

When the specimen 444 is prepared, one kind of first precursor dispersion (as shown in Table 1) is used to form the inner polymer layer 121, and two second kinds of precursor dispersion (as shown in Table 1) are used to form an inner polymer layer 121. Therefore, the inner polymer layer 121 is a single layer, and the outer polymer layer 122 has two sublayers.

When the specimen 555 is prepared, two first precursor dispersions (as shown in Table 1) are used to form the inner polymer layer 121, and two second precursor dispersion (as shown in Table 1) are used to form an inner polymer layer 121. Therefore, the inner polymer layer 121 has two sublayers, and the outer polymer layer 122 has two sublayers, too.

Comparative Example 1

A protective coating is prepared on the printed circuit board as the product body 11 by using the ordinary method; therefore the specimen 666 is formed.

The thickness of the protective coating of specimen 666 is tested. The static water contact angle (WCA) of the protective coating is tested (the environment parameters of the test: 25° C./50%). The adhesion test is performed according to GBT9286-1998 standard. The resistance to salt spray corrosion test is performed in a 5% (mass) NaCl solution (pH value: 6.5 to 7.2) at 35±1° C. according to GB6458-86-salt spray test national standard. The flexural resistance test is performed. The light transmittance test is performed according to GB-T2410-2008 standard. The test results are shown in Table 2.

TABLE 1

| | First precursor dispersion | | | | | Inner polymer layer thickness/nm | Outer polymer layer thickness/nm |
|---|---|---|---|---|---|---|---|
| | Alkoxysilane | Adhesive resin | Fluorescent agent | Catalyst | Isocyanate curing agent | | |
| Specimen 111 | 24.3 | Silicone resin 1.4 | Stilbene type 0.08 | Alkyl titanium 0.05 | 4.2 | 1055 | 1080 |
| Specimen 222 | 9.7 | Silicone resin 1.2 | Stilbene type 0.01 | Alkyl titanium 0.01 | 0.2 | 480 | 1930 |
| Specimen 333 | 20.9 | Epoxy resin 0.9 | Stilbene type 0.05 | Alkyl titanium 1 | 2.3 | First sublayer 1023 | 2084 |
| | 16.0 | Silicone resin 0.5 | Coumarin type 0.04 | Alkyl aluminum 0.8 | 1.8 | Second sublayer 846 | |
| Specimen 444 | 18.6 | Silicone resin 1.2 | Stilbene type 0.1 | Alkyl titanium 0.5 | 1.4 | 976 | First sublayer 988 |
| | | | | | | | Second sublayer 1265 |
| Specimen 555 | 12.5 | Epoxy resin 1.3 | Stilbene type | Alkyl titanium 0.4 | 1.3 | First sublayer 680 | First sublayer 1147 |
| | 13.4 | Silicone resin 1.5 | Coumarin type | Alkyl titanium 0.5 | 1.2 | Second sublayer 825 | Second sublayer 865 |
| Specimen 666 | — | — | — | — | — | Total thickness of the polymer protective coating/nm: 2546 | |

TABLE 1-continued

| | Second precursor dispersion | | | | |
|---|---|---|---|---|---|
| | Perfluorocarbon organosiloxane | Fluorescent agent | Catalyst | Isocyanate curing agent | Inner polymer layer thickness/nm |
| Specimen 111 | 22.8 | Stilbene type 0.1 | Alkyl titanium alkyl 0.8 | 3.2 | 1055 |
| Specimen 222 | 23.7 | Coumarin type 0.08 | Alkyl aluminum 0.7 | 4.3 | 480 |
| Specimen 333 | 24.9 | Pyrazoline type 0.09 | Alkyl titanium 0.7 | 5 | First sublayer 1023 Second sublayer 846 |
| Specimen 444 | Perfluorobutyl acrylate 20.2 | Stilbene type 0.06 | Alkyl titanium 0.5 | 4.0 | 976 |
| | Perfluorophenethyl acrylate 23.1 | Benzoxazole type 0.07 | Alkyl tin 0.5 | 4.0 | |
| Specimen 555 | Perfluorobutyl acrylate 21.2 | Pyrazoline type 0.05 | Alky titanium 0.4 | 3.8 | First sublayer 680 |
| | Perfluorophenethyl acrylate 17.8 | Benzoxazole type 0.05 | Alkyl titanium 0.4 | 3.5 | Second sublayer 825 |
| Specimen 666 | — | — | — | — | — |

TABLE 2

| | WCA/° | Adhesion | Salt spray corrosion for 96 hours | Flexural resistance | Transmittance/% |
|---|---|---|---|---|---|
| Specimen 111 | 125 | Level 0 | Level 0 | Level 2 | 90 |
| Specimen 222 | 118 | Level 0 | Level 0 | Level 1 | 94 |
| Specimen 333 | 120 | Level 0 | Level 0 | Level 0 | 91 |
| Specimen 444 | 124 | Level 0 | Level 0 | Level 3 | 95 |
| Specimen 555 | 122 | Level 0 | Level 0 | Level 1 | 89 |
| Specimen 666 | 110 | Level 2 | Level 4 | Level 3 | 92 |

Table 1 shows the weight percentage of fluorine-containing polymer of each specimen. More specifically, the weight percentage of fluorine-containing polymer of the fluorine-containing polymer layer of specimen 111 is: 22.8%/(22.8%+0.1%+0.8%+3.2%)=84.7%. The weight percentage of fluorine-containing polymer of the fluorine-containing polymer layer of specimen 222 is: 23.7%/(23.7%+0.08%+0.7%+4.3%)=82.3%. The weight percentage of fluorine-containing polymer of the fluorine-containing polymer layer of specimen 333 is: 24.9%/(24.9%+0.09%+0.7%+5%)=81.1%. The weight percentage of fluorine-containing polymer of the first sublayer of the fluorine-containing polymer layer of specimen 444 is: 20.2%/(20.2%+0.06%+0.5%+4.0%)=81.6%. The weight percentage of fluorine-containing polymer of the second sublayer of the fluorine-containing polymer layer of specimen 444 is: 23.1%/(23.1%+0.07%+0.5%+4.0%)=83.5%. The weight percentage of fluorine-containing polymer of the first sublayer of the fluorine-containing polymer layer of specimen 555 is: 21.2%/(21.2%+0.05%+0.4%+3.8%)=83.3%. The weight percentage of fluorine-containing polymer of the second sublayer of the fluorine-containing polymer layer of specimen 555 is: 17.8%/(17.8%+0.05%+0.4%+3.5%)=81.8%.

It should be noted that the formula mentioned above is illustrative, the present disclosure is not limited thereof. In some embodiments, the first precursor dispersion may comprise 0.1 to 25 wt % of an alkoxysilane and the second precursor dispersion may comprise 0.1 to 25 wt % of a perfluorocarbon organosiloxane. In some embodiments, the first precursor dispersion may comprise 0.1 to 25 wt % of an alkoxysilane, 0.5 to 1.5 wt % of an adhesive resin, 0.01 to 0.1 wt % of a fluorescent agent, 0.1 to 5 wt % of an isocyanate curing agent, 0.01 to 1.0 wt % of a catalyst, and the rest is a hydrofluoroether solvent. Moreover, the second precursor dispersion may comprise 0.1 to 25 wt % of a perfluorocarbon organosiloxane, 0.01 to 0.1 wt % of a fluorescent agent, 0.1 to 5 wt % of an isocyanate curing agent, 0.01 to 1.0 wt % of a catalyst, and the rest is a hydrofluoroether solvent. It means, after drying the first precursor dispersion and the second precursor dispersion, the hydrofluoroether solvent is fully volatilized. In this case, the maximum weight percentage of perfluorocarbon organosiloxane of the fluorine-containing polymer layer (formed from the dried first precursor dispersion) is 25 wt %/(25 wt %+0.01 wt %+0.1 wt %+0.01 wt %)=99.5 wt %.

As mentioned above, the fluorine-containing polymer layer substantially comprises 81.1-99.5 wt % of the fluorine-containing polymer (for example, perfluorocarbon organosiloxane).

Table 2 shows that the differences between the thickness of the polymeric protective coatings 12 of the specimen 111 and the specimen 222 as well as the thickness of the polymer protective coatings 12 of the specimen 666 are small, but the resistances of salt spray corrosion of the specimen 111 and the specimen 222 are better than the resistance to salt spray corrosion of the specimen 666. In addition, the static water contact angles (WCA) of the specimen 111, the specimen 222, the specimen 333, the specimen 444, and the specimen 555 are higher than the static water contact angle (WCA) of specimen 666, thereby it can be realized that the specimen 111, the specimen 222, the specimen 333, the specimen 444, and the specimen 555 have greater waterproof performance. It can be realized that the product 10 with a protective coating manufactured according to the method of the application has good waterproof performance and resistance to salt spray corrosion. Meanwhile, the polymer protective coating 12 of the application can have excellent waterproof performance and resistance to salt spray corrosion with at least 89% transmittance.

According to the manufacturing method of the application, the first precursor dispersion and the second precursor dispersion are directly applied to the product body 11 used as the substrate, thereby it can significantly improve the efficiencies of applying the first precursor dispersion and the second precursor dispersion. Therefore, the film formation rate is significantly improved.

In this embodiment and some other embodiments, before the step of drying the applied first precursor dispersion to form the first dried layer, the method further comprises the step of masking the product body 11. After the step of drying the applied first precursor dispersion to form the first dried layer, the method further comprises the step of demasking the product body 11. The steps can be adjusted based on the conditions of the manufacturing method, and the application is not limited thereto. The application can have various modifications and variations. A polymer protective coating 12 can be formed on the product body 11 with sensitive components (such as microphones, sensors, etc.) through the steps of masking/demasking described above.

In the embodiments of the application, in order to form the polymer protective coating 12 described herein, the dispersions can be formed on the surface of the product body 11 by spraying. In detail, liquid is atomized and applied to the surface of the product. Atomized spraying is beneficial to form a larger area of the coating. For example, a large-area product can be entirely and quickly protected through a high-precision spray valve or a large-area atomization spray valve or a water curtain spray valve. It is noted that the dispersion must have suitable adhesion when the coating is formed by spraying. For example, the viscosity of the dispersion must be less than 2000 cps. In some embodiments of the application, the viscosity of the dispersion can be less than 1000 cps. The application is not limited to the viscosity of the dispersion.

According to the disclosure of the application, selective protection for partial locations can be performed, and more specifically, targeted protection for specific locations of the product can be performed. For example, in one embodiment of the application, the coating described herein can be formed by brushing. Since it is more maneuverable for brushing, an edge of the coating can be well formed under control, such that the polymer protective coating 12 can form a neat boundary on the product body 11. On the other hand, when a surface structure of the product body 11 is more complex, for example, when there are concavo-convex structure on the product body 11, it is difficult to form a uniform polymer protective coating 12 through spraying on the surface. For those embodiments, the uniform polymer protective coating 12 can be effectively formed on the concavo-convex surface of the product body 11 through brushing the concave part and the convex part of the product body 11, respectively. It is noted that, when a polymer protective coating 12 is formed through brushing, a suitable adhesion of the dispersion is required. For example, the viscosity of the dispersion should be less than 1000 cps. In some embodiments of the application, the viscosity of dispersion can be less than 500 cps. Wherein the application is not limited to the viscosity of the dispersion.

In the embodiments of the application, the polymer protective coating 12 described herein can be formed by dot coating so as to form a polymer protective coating 12 on the structures which are more complex and/or more refined. In addition, the product body 11 with the formed polymer protective coating 12 can be improved through dot coating. For example, the slits in the polymer protective coating 12 can be reinforced. Further, there are more options of the viscosity of dispersion when the polymer protective coating 12 is formed through dot coating. For example, the viscosity of the dispersion can be less than or equal to 1000 cps, or the viscosity of the dispersion can be 1000 cps to 2000 cps. The viscosity of the dispersion can also be more than or equal to 2000 cps.

This disclosure is not limited to the above method of forming a coating by spraying, brushing, or dot coating. In other embodiments, the dispersion can also be formed on the surface of the product body 11 by dipping, atomizing spraying, etc.

A coating can be formed through spraying, brushing, dot coating and other combinations described above thereof, according to a variety of cases. That is, a corresponding polymer protective coating 12 can be formed according to the characteristics of different product bodies 11. Various embodiments are given below for illustrative explanations.

Figure 4:
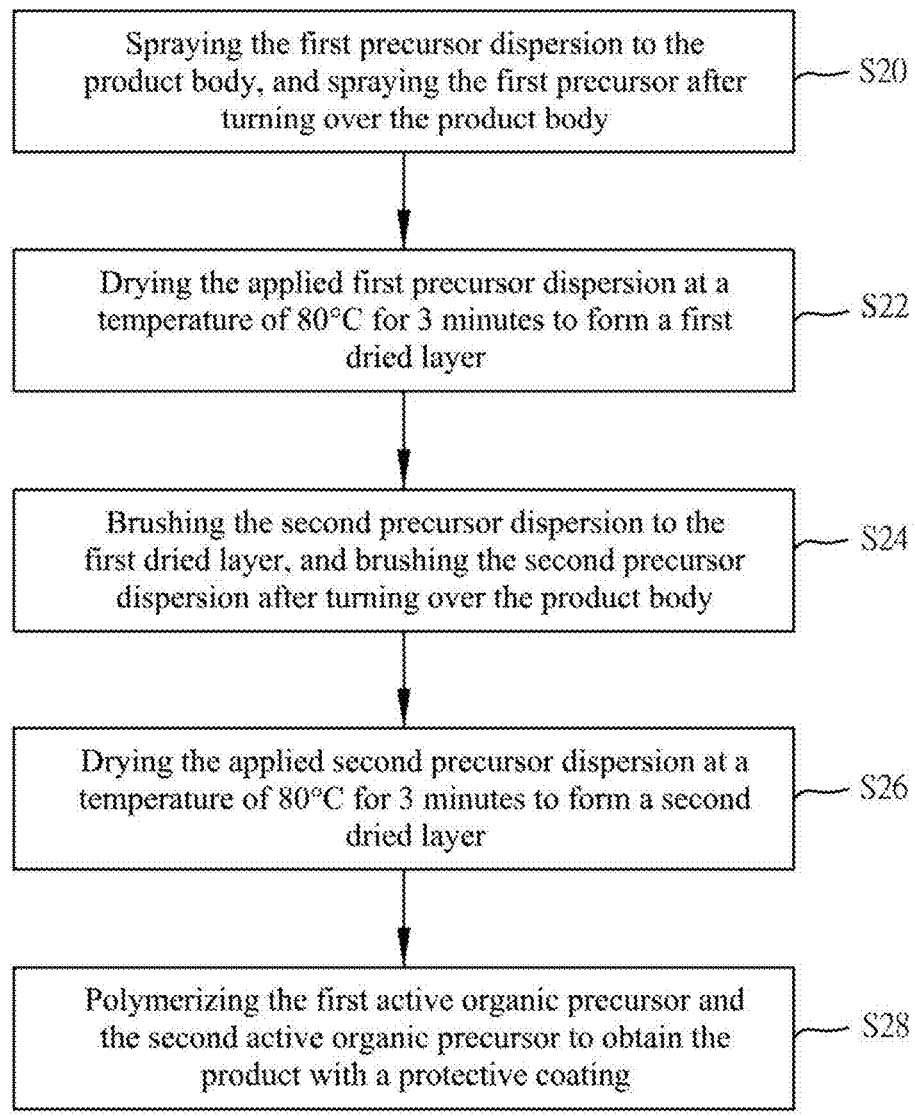
FIG. 4 is a flowchart of the second embodiment of the manufacturing method of the product with a protective coating of the application.

For example, the manufacturing method can be used for the entire surface protection of the large-area product body 11 by using a high-precision spray valve or a large-area atomization spray valve or a water curtain spray valve. Please refer to FIG. 1 and FIG. 4. FIG. 4 is a flowchart of the second embodiment of the manufacturing method of the product with a protective coating of the application. In the following description, the polymer protective coating 12 is formed on two surfaces of the product body 11; therefore the two surfaces need to be treated and the polymer protective coating 12 is formed thereon, respectively. In detail, before the step of applying the first precursor dispersion and the second precursor dispersion, a pretreatment is performed to the two surfaces of the product body so as to clean and/or activate the surfaces. In detail, the pretreatment comprises one or more of a plasma treatment, an electric discharge treatment, a sandblasting treatment, a polishing treatment, a flame treatment, and a primer treatment. The plasma treatment is taken as an example in this embodiment. As shown in step S20, the first precursor dispersion is sprayed on the product body 11 (such as a printed circuit board), and the first precursor dispersion is sprayed again after turning the product body 11, that is, the first precursor dispersion is entirely sprayed to cover the two surfaces of the product body 11. Then, as shown in step S22, the applied first precursor is dried at a temperature of 70 to 90° C. for 1 to 10 minutes after spraying. In one embodiment, the applied first precursor is dried at a temperature of 80° C. for 3 minutes so as to form the first dried layer, that is, the inner polymer layer 121. As shown in step S24, the second precursor dispersion is brushed on the first dried layer, and the second precursor dispersion is sprayed again after turning the product body 11; that is, the second precursor dispersion is entirely brushed to cover the first dried layer. Then, as shown in step S26, the applied second precursor dispersion is dried at a temperature of 70 to 90° C. for 1 to 10 minutes after brushing. In one embodiment, the applied second precursor dispersion is dried at a temperature of 80° C. for 3 minutes to form a second dried layer, that is, the outer polymer layer 122. Finally, as shown in step S28, the applied first precursor dispersion and the applied second precursor dispersion are polymerized to obtain the product 10 with a protective coating. The first precursor dispersion forming on the surface of the product body 11 by spraying and the second precursor dispersion forming on the surface of the product body 11 by brushing are suitable for a large and flat area and are good in liquid leveling and leading to a uniform coverage. It is noted that, since brushing is more destructive to the polymer protective coating 12, the first precursor dispersion needs to be dried to form a first dried layer or to reach a state of surface dryness (i.e., one can sense that the surface is dried when touching the surface) before brushing the second precursor dispersion.

Figure 5:
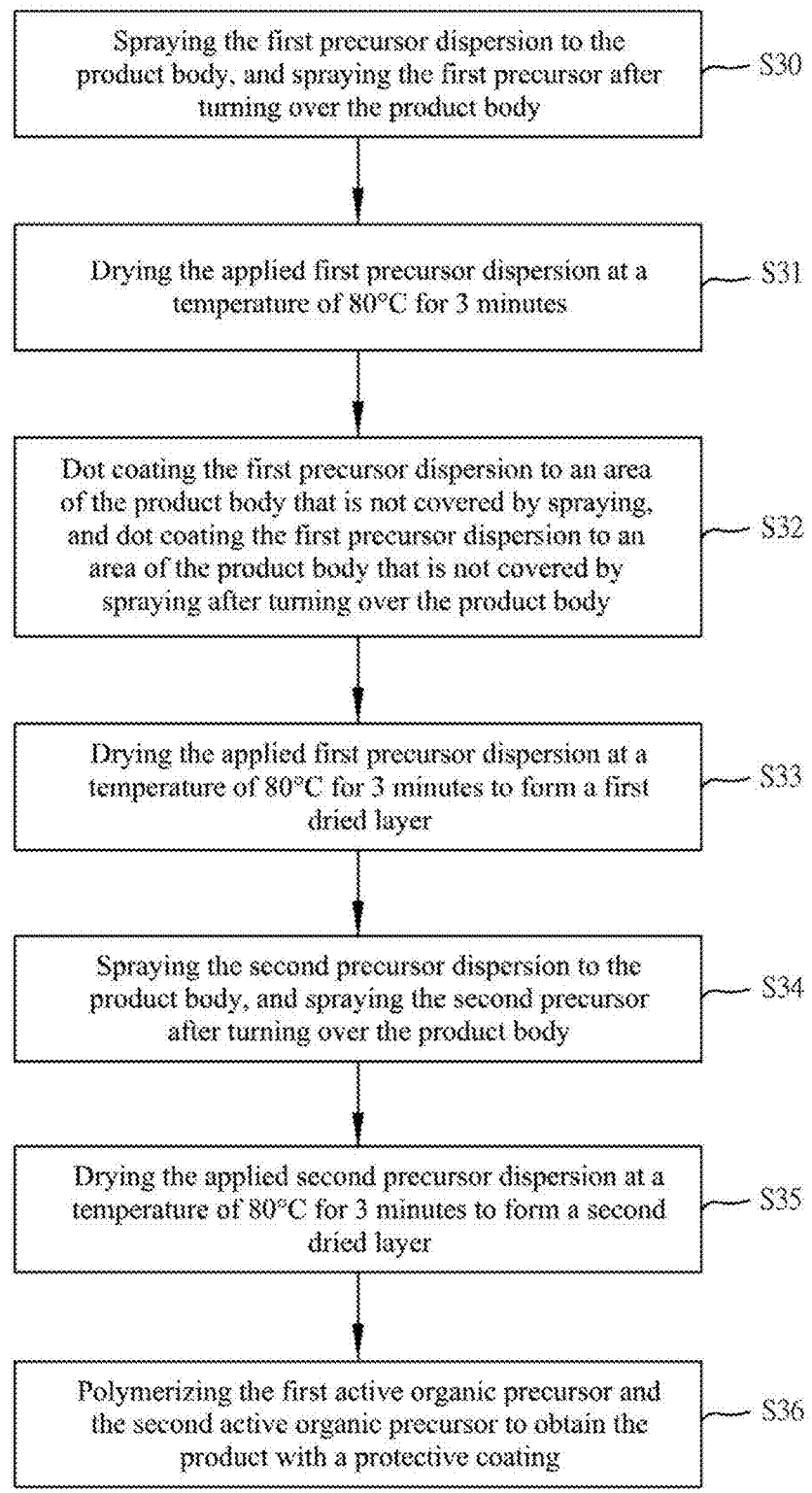
FIG. 5 is a flowchart of the third embodiment of the manufacturing method of the product with a protective coating of the application.

Refer to FIG. 1 and FIG. 5, and FIG. 5 is a flowchart of the third embodiment of the manufacturing method of the product with a protective coating of the application. In the following description, the polymer protective coating 12 is formed on two surfaces of the product body 11; therefore, the two surfaces need to be treated and the polymer protective coating 12 is formed thereon, respectively. This embodiment is suitable for those products with rugged parts and/or slits on part of its surface. Therefore, the inner polymer layer 121 is applied twice so as to cover an area, which is not completely covered after the first spraying process. That is, this embodiment is used for forming the coating on the product body 11 with a rugged surface through dot coating or compensating the slits generated from spraying (i.e. the surface is not covered completely by spraying). In detail, before the step of applying the first precursor dispersion and the second precursor dispersion, a pretreatment is performed to the two surfaces of the product body so as to clean and/or activate the surfaces. In detail, the pretreatment comprises one or more of a plasma treatment, an electric discharge treatment, a sandblasting treatment, a polishing treatment, a flame treatment, and a primer treatment. The plasma treatment is taken as an example in this embodiment. As shown in step S30, the first precursor dispersion is sprayed on the product body 11 (such as a printed circuit board), and the first precursor dispersion is sprayed again after turning over the product body 11, that is, the first precursor dispersion is entire sprayed to cover the two surfaces of the product body 11. Then, as shown in step S31, the applied first precursor is dried at a temperature of 70 to 90° C. for 1 to 10 minutes after spraying. In one embodiment, the applied first precursor is dried at a temperature of 80° C. for 3 minutes. Then, as shown in step S32, the first precursor dispersion is dot coated to an area of the product body 11 that is not covered by spraying, and the first precursor dispersion is dot coated again to an area of the product body that is not covered by spraying after turning over the product body 11. Then, as shown in step S33, the applied first precursor dispersion is dried at a temperature of 80° C. for 3 minutes to form a first dried layer, that is, the inner polymer layer 121. Uniformity and reliability of the polymer protective coating 12 can be increased through the two steps of coating. After the coating problems of partial area with rugged parts and slits are solved, as shown in step S34, the second precursor dispersion is sprayed on the first dried layer, and the second precursor dispersion is sprayed again on the first dried layer after turning over the product body 11. That is, the second precursor dispersion is entirely sprayed to cover the first dried layer. Then, as shown in step S35, the applied second precursor dispersion is dried at a temperature of 70 to 90° C. for 1 to 10 minutes after spraying. In one embodiment, the applied second precursor dispersion is dried at a temperature of 80° C. for 3 minutes so as to form a second dried layer, that is, the outer polymer layer 122. Finally, as shown in step S36, the first precursor dispersion and the second precursor dispersion are polymerized to obtain the product 10 with a protective coating.

Figure 6:
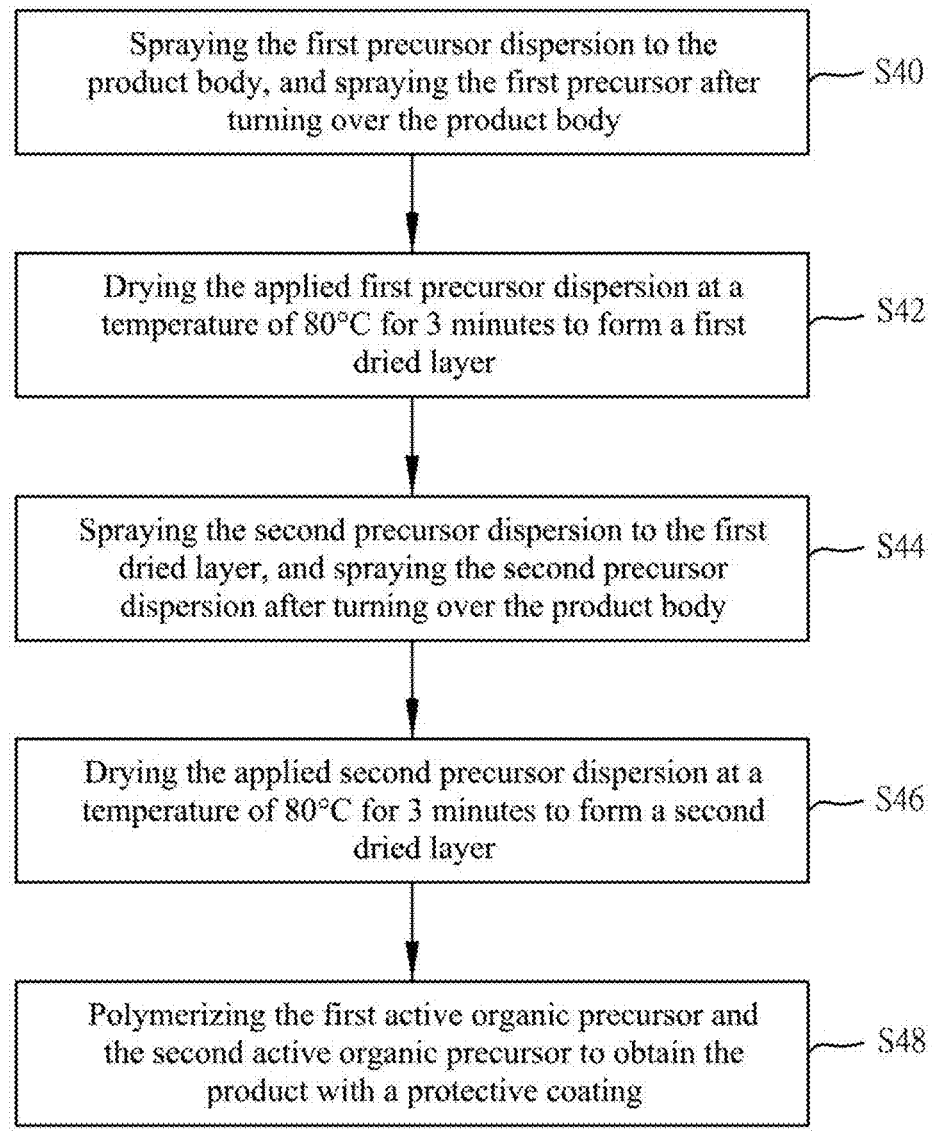
FIG. 6 is a flowchart of the fourth embodiment of the manufacturing method of the product with a protective coating of the application.

Refer to FIG. 1 and FIG. 6. FIG. 6 is a flowchart of the fourth embodiment of the manufacturing method of the product with a protective coating of the application. In the following description, the polymer protective coating 12 is formed on two surfaces of the product body 11; therefore, the two surfaces need to be treated and the polymer protective coating 12 is formed thereon, respectively. In detail, before the step of applying the first precursor dispersion and the second precursor dispersion, a pretreatment is performed to the two surfaces of the product body so as to clean and/or activate the surfaces. In detail, the pretreatment comprises one or more of a plasma treatment, an electric discharge treatment, a sandblasting treatment, a polishing treatment, a flame treatment, and a primer treatment. As shown in step S40, the first precursor dispersion is sprayed on the product body 11 (such as a printed circuit board), and the first precursor dispersion is sprayed again after turning over the product body 11; that is, the first precursor dispersion is entirely sprayed to cover the two surfaces of the product body 11. Then, in step S42, the applied first precursor dispersion is dried at room temperature for 1 to 10 minutes, and wherein the room temperature refers to 20 to 25° C. In this embodiment, the applied first precursor dispersion is dried at a temperature of 20° C. for 2 minutes so as to form a first dried layer, that is, the inner polymer layer 121. It is noted that the drying conditions in this embodiment are suitable for these product bodies 11, which have a higher requirement for residual surface stress, and those applications, which have a higher requirement for bonding force between the upper layers and lower layers. Therefore, the first precursor dispersion can be dried at room temperature so as to reduce residual stress. Further, as shown in step S44, the second precursor dispersion is brushed to the first dried layer, and the second precursor dispersion is sprayed again after turning the product body 11; that is, the second precursor dispersion is entirely sprayed to cover the first dried layer. Then, as shown in step S46, the applied second precursor dispersion is dried at a temperature of 70 to 90° C. for 1 to 10 minutes after brushing. In this embodiment, the applied second precursor dispersion is dried at a temperature of 80° C. for 3 minutes so as to form a second dried layer, that is, the outer polymer layer 122. Finally, as shown in step S48, the first precursor dispersion and the second precursor dispersion are polymerized to obtain a product with a protective coating 10. In this step, the method also comprises a plasma activating treatment; therefore the surface energy of the fluorine-containing materials can be improved so as to facilitate the bonding and usage for subsequent materials.

Figure 7:
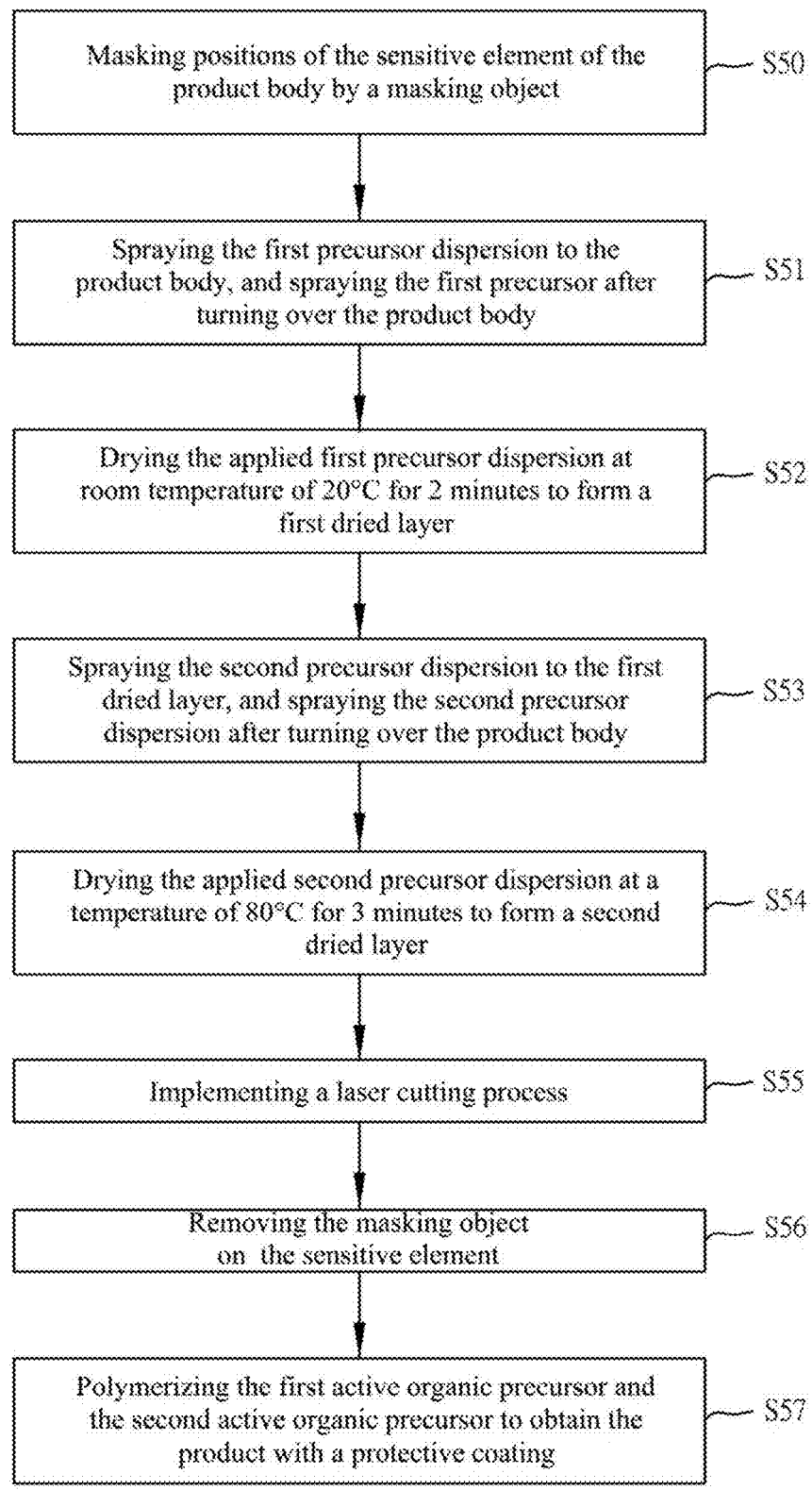
FIG. 7 is a flowchart of the fifth embodiment of the manufacturing method of the product with a protective coating of the application.

Polymer protective coating 12 can be formed on not only the entire surface of the product body 11 but also parts of the surface of the product body 11, such that it is suitable for positions of sensitive components, such as a microphone, a sensor or the like, of the product body 11, which need to be masked. FIG. 7 is a flowchart of the fifth embodiment of the manufacturing method of the product with a protective coating of the application. As shown in step S50, a masking element is used to mask positions of the sensitive components (such as microphones, sensors, etc.) of the product body 11. Before the step of applying the first precursor dispersion and the second precursor dispersion, a pretreatment is performed to the two surfaces of the product body so as to clean and/or activate the surfaces. In detail, the pretreatment comprises one or more of a plasma treatment, an electric discharge treatment, a sandblasting treatment, a polishing treatment, a flame treatment, and a primer treatment. As shown in step S51, the first precursor dispersion is sprayed on the product body 11 (such as a printed circuit board), and the first precursor dispersion is sprayed again after turning over the product body 11; that is, the first precursor dispersion is entirely sprayed to cover the two surfaces of the product body 11 (except for the positions of the sensitive components which have been masked). Then, as shown in step S52, the applied first precursor dispersion is dried at room temperature for 1 to 10 minutes, and wherein the room temperature refers to 20 to 25° C. In this embodiment, the applied first precursor dispersion is dried at a temperature of 20° C. for 2 minutes to form a first dried layer, that is, the inner polymer layer 121. As shown in step S53, the second precursor dispersion is brushed to the first dried layer, and the second precursor dispersion is sprayed again after turning the product body 11; that is, the second precursor dispersion is entire sprayed to cover the first dried layer. Then, as shown in step S54, the applied second precursor dispersion is dried at a temperature of 70 to 90° C. for 1 to 10 minutes after brushing. In this embodiment, the applied second precursor dispersion is dried at a temperature of 80° C. for 3 minutes to form a second dried layer, that is, the outer polymer layer 122. In step S55, a laser cutting process is performed such that an unnecessary region of the product body 11 is cut and removed. In step S56, the masking element disposed on the sensitive element is removed. Finally, as shown in step S57, the first precursor dispersion and the second precursor dispersion are polymerized to obtain a product with a protective coating 10.

According to the above descriptions, the advantages of the application is that the polymer protective coating comprises the inner polymer layer in contact with the product body and the outer polymer layer covering the outer surface of the inner polymer layer. Therefore, the waterproof performance of the polymer protective coating or the product body and the ability of anti-ultraviolet aging and self-cleaning function are improved by fully utilizing hydrophobicity, being not sticky to the touch, and resistance to ultraviolet radiation of the fluorine-containing polymer layer as the outer layer of the polymer. In addition, the inner polymer layer and the outer polymer layer formed by in-situ polymerization form a polymer protective coating together, so that the inner polymer layer and the outer polymer layer can compensate with each other in structure to form a dense protective coating. Therefore, the waterproof performance and resistance to salt spray corrosion of the polymer protective coating and the product body are improved. Furthermore, in the application, the first precursor dispersion and the second precursor dispersion can be applied by different combinations of spraying, dot coating, brushing, dipping, or atomizing spraying according to the manufacturing parameters of different products, such that the efficiency of applying the first precursor dispersion and the second precursor dispersion can be improved, and the film formation rate is significantly improved.

The above descriptions are only examples of this application and are not intended to limit this application. This disclosure may have various modifications and changes for a person of ordinary skill in the art. Any modification, equivalent replacement, improvement, etc. made within the spirit and principle of this application shall be included in the scope of the claims of this disclosure.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

What is claimed is:

1. A product with a protective coating, comprising:
   a product body,
   a first dried layer formed on a surface of the product body, wherein the first dried layer is transformable by in-situ polymerization into an inner polymer layer;
   a second dried layer formed on a surface of the first dried layer, wherein the second dried layer is transformable by in-situ polymerization into an outer polymer layer;
   wherein the protective coating comprises the inner polymer layer in contact with the product body and the outer polymer layer covering an outer surface of the inner polymer layer,
   wherein the outer polymer layer is a fluorine-containing polymer layer formed by in-situ polymerization, and the inner polymer layer is a fluorine-free polymer layer formed by in-situ polymerization.

2. The product with a protective coating according to claim 1, wherein a thickness of the outer polymer layer is greater than or equal to a thickness of the inner polymer layer,
   wherein the thickness of the outer polymer layer is 0.5 to 10 μm, and the thickness of the inner polymer layer is 0.1 to 2 μm.

3. The product with a protective coating according to claim 1, wherein the fluorine-containing polymer layer is a perfluorocarbon organosiloxane polymer layer, and the fluorine-free polymer layer comprises one or more of an alkoxysilane polymer layer, an epoxy resin polymer layer, a polyurethane polymer layer, and an acrylate polymer layer.

4. The product with protective coating according to claim 1, wherein the inner polymer layer and/or the outer polymer layer comprises a fluorescent agent.

5. The product with a protective coating according to claim 4, wherein the fluorescent agent is an externally added fluorescent agent, and the externally added fluorescent agent comprises one or more of a stilbene type fluorescent agent, a coumarin type fluorescent agent, a pyrazoline type fluorescent agent, a benzoxazole type fluorescent agent, and a dicarboximide type fluorescent agent.

6. The product with a protective coating according to claim 4, wherein the fluorescent agent is an internally added fluorescent agent, and the internally added fluorescent agent is connected to the outer polymer layer and/or the inner polymer layer,
   wherein the internally added fluorescent agent is connected to the outer polymer layer and/or the inner polymer layer through one or more of an epoxy group, an unsaturated triple bond, an unsaturated double bond, an organosilicon, a —COONH—, a —OH, a —COOH, a —NH$_2$, and a —SH.

7. The product with a protective coating according to claim 4, wherein the inner polymer layer and the outer polymer layer both comprise a fluorescent agent, and the fluorescent agent in the inner polymer layer and the fluorescent agent in the outer polymer layer are different.

8. The product with a protective coating according to claim 1, wherein the inner polymer layer comprises a plurality of inner polymer sublayers and/or the outer polymer layer comprises a plurality of outer polymer sublayers.

9. The product with a protective coating according to claim 1, wherein the inner polymer layer and the outer polymer layer are chemically cross-linked together.

10. The product with a protective coating according to claim 1, wherein the inner polymer layer comprises an adhesive resin,
wherein the adhesive resin is selected from the group consisting of a silicone resin, an epoxy resin, an acrylic resin, a polyurethane resin and a polyester resin.

11. The product with a protective coating according to claim 1, wherein the fluorine-containing polymer layer comprises 81.1-99.5 wt % of the fluorine-containing polymer.

12. The product with a protective coating according to claim 3, wherein the alkoxysilane polymer layer is amphiphilic, having an organic end compatible with the outer polymer layer, and a silane end configured for attachment to the product body.

13. The product with a protective coating according to claim 1, wherein a static water contact angle of the polymer protective coating is at least 118 degrees.

14. The product with a protective coating according to claim 1, wherein a transmittance of the polymer protective coating is at least 89%.

15. The product with a protective coating according to claim 1, wherein the inner polymer layer has a thickness between 480 nm and 1055 nm.

16. The product with a protective coating according to claim 8, wherein at least one of the inner polymer sublayers has a thickness between 480 nm and 1023 nm.

17. The product with a protective coating according to claim 8, wherein at least one of the outer polymer sublayers has a thickness between 988 nm and 1265 nm.

18. The product with a protective coating according to claim 1, wherein the first dried layer comprises 0.1 to 25 wt % of an alkoxysilane; 0.5 to 1.5 wt % of an adhesive resin; 0.01 to 0.1 wt % of a fluorescent agent; 0.1 to 5 wt % of an isocyanate curing agent; and 0.01 to 1.0 wt % of a catalyst.

19. The product with a protective coating according to claim 1, wherein the second dried layer comprises 0.1 to 25 wt % of a perfluorocarbon organosiloxane; 0.01 to 0.1 wt % of a fluorescent agent; 0.1 to 5 wt % of an isocyanate curing agent; and 0.01 to 1.0 wt % of a catalyst.

20. The product with a protective coating according to claim 1, wherein the inner polymer layer and the outer polymer layer both have a uniformly polymerized film structure, and the uniformly polymerized film structure has no pinholes or defects.

* * * * *